United States Patent [19]

Deitz et al.

[11] Patent Number: 5,817,779
[45] Date of Patent: Oct. 6, 1998

[54] AZO REACTIVE DYES, THEIR PREPARATION AND USE

[75] Inventors: Rolf Deitz, Kandren, Germany; Paul Herzig, Basel; Athanassios Tzikas, Pratteln, both of Switzerland

[73] Assignee: Ciba Specialty Chemicals Corporation, Tarrytown, N.Y.

[21] Appl. No.: 783,183

[22] Filed: Jan. 15, 1997

[30] Foreign Application Priority Data

Jan. 19, 1996 [CH] Switzerland .......................... 00150/96

[51] Int. Cl.$^6$ .......................... C09D 62/09; C09D 62/513; D06P 1/38; D06P 1/382; D06P 1/384
[52] U.S. Cl. .......................... 534/637; 534/642
[58] Field of Search ...................... 534/637, 642

[56] References Cited

U.S. PATENT DOCUMENTS 5,565,553  10/1996  Deitz et al. .......................... 534/612

FOREIGN PATENT DOCUMENTS 0647683  4/1995  European Pat. Off. .
1349168  3/1974  United Kingdom .

OTHER PUBLICATIONS

Derwent Abst. 96–018304/02 and English Translation of KR–B–94/02560 (1996).

*Primary Examiner*—Floyd D. Higel
*Attorney, Agent, or Firm*—David R. Crichton

[57] ABSTRACT

Described are compounds of formula

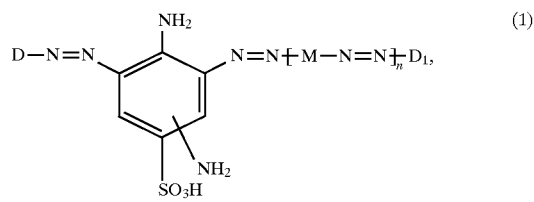

(1)

which are suitable as fibre-reactive dyes for dyeing and printing a very wide range of different fibre materials.

21 Claims, No Drawings

AZO REACTIVE DYES, THEIR PREPARATION AND USE

The present invention relates to novel reactive dyes, to their preparation and to the use thereof for dyeing or printing textile fibre materials.

The practice of dyeing with reactive dyes has given rise in recent times to more stringent demands being made on the quality of the dyeings and on the economy of the dyeing process. For this reason, there is still a need for novel reactive dyes with improved properties, especially application properties.

At the present time it is necessary to provide reactive dyes which have sufficient substantivity and which at the same time have good washing off properties with respect to unfixed dye. The dyes shall have a good tinctorial yield and high reactivity, and they shall also give, in particular, dyeings with high fixation. The dyes of the prior art do not meet these requirements in all respects.

The present invention therefore has for its object to provide novel improved reactive dyes for dyeing and printing fibre materials and which have the above specified qualities to a high degree. The novel dyes shall be distinguished in particular by excellent fixation yield and superior fibre-dye bond stability, and further they shall have the property of being easily washed off to remove unfixed dye. They shall also produce dyeings with good allround properties, for example lightfastness and wetfastness.

It has been found that this object is substantially achieved with the novel reactive dyes defined below.

Accordingly, the invention relates to compounds of formula

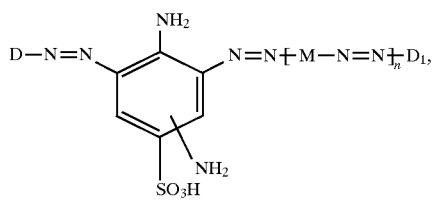

wherein $D_1$ is a radical of formula

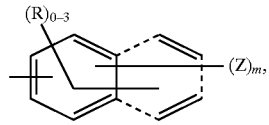

D is a radical of formula

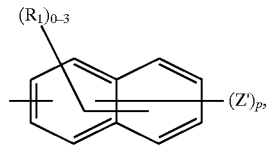

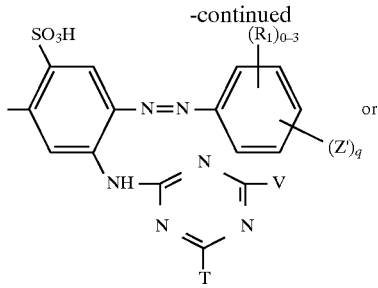

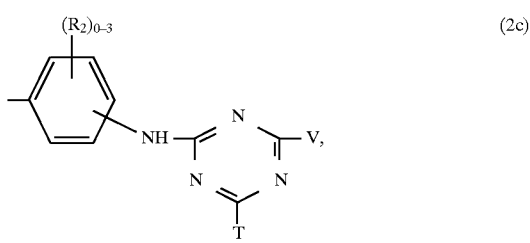

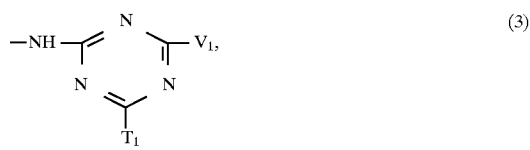

M is a phenylene radical which is unsubstituted or substituted by sulfo, $C_1$-$C_4$alkyl, $C_1$-$C_4$-alkoxy, halogen, $C_2$-$C_4$alkanoylamino, ureido or a radical of formula $$-NH-\overset{N}{\underset{N}{\diagup}}\overset{}{\underset{T_1}{\diagdown}}V_1, \qquad (3)$$

or a naphthylene radical which is unsubstituted or substituted by sulfo or hydroxy, $(R)_{0-3}$, $(R_1)_{0-3}$ and $(R_2)_{0-3}$ are each independently of one another 0 to 3 identical or different radicals selected from the group consisting of sulfo, $C_1$-$C_4$alkyl, $C_1$-$C_4$alkoxy and halogen, T and $T_1$ are each independently of the other halogen or 1-pyridinyl which is unsubstituted of substituted by carbamoyl or carboxy, V and $V_1$ are each independently of the other a non-reactive amino radical, Z and Z' are each independently of the other a radical of formula $$-SO_2\text{-}Y \qquad (4a)$$
$$-CONH\text{-}(CH_2)_r\text{-}SO_2\text{-}Y \qquad (4b),$$

Y is vinyl or a -$CH_2$-$CH_2$-U radical, and U is a leaving group, r is an integer from 1 to 6, and n, m, p and q are each independently of one another a number from 0 to 1, with the proviso that m is 1 if D is a radical of formula (2c) or a radical of formula (2a) or (2b), wherein p or q is 0.

$(R)_{0-3}$, $(R_1)_{0-3}$ and $(R_2)_{0-3}$ are each independently of one another preferably 0 to 3 radicals selected from the group consisting of sulfo, methyl and methoxy.

If Y is a -$CH_2$-$CH_2$-U radical, then the leaving group U can be, for example, -Cl, -Br, -F, -$OSO_3H$, -$SSO_3H$, -OCO-$CH_3$, $OPO_3H_2$, -OCO-$C_6H_5$, $OSO_2$-$C_1$-$C_4$alkyl or -$OSO_2$-$N(C_1$-$C_4$-alkyl$)_2$. U is preferably a group of formula -Cl, -$OSO_3H$, -$SSO_3H$, -OCO-$CH_3$, -OCO-$C_6H_5$ or -$OPO_3H_2$, in particular -Cl or -$OSO_3H$ and, particularly preferably, -$OSO_3H$.

Y is preferably vinyl, β-chloroethyl, β-sulfatoethyl, β-thiosulfatoethyl, β-acetoxyethyl, β-phenoxyethyl or β-phosphatoethyl and, particularly preferably, β-sulfatoethyl or vinyl.

r is preferably 2, 3 or 4, particularly preferably 2 or 3 and, most preferably, 2.

Z and Z' are each independently of the other a radical of formula (4a), wherein Y has the meanings and preferred meanings given above.

Illustrative examples of suitable T and $T_1$ are bromo, chloro, fluoro, 3-carbamoylpyridin-1-yl or 3-carbamoylpyridin-1-yl. T and $T_1$ are each independently of the other preferably chloro or fluoro and, particularly preferably, chloro. T and $T_1$ can be different or, preferably, identical. Where V and $V_1$ are non-reactive amino radicals they can typically be amino; N-$C_1$-$C_4$-alkylamino or N,N-di-$C_1$-$C_4$alkylamino, alkyl in each case being substituted by e.g. sulfo, sulfato, hydroxy, carboxy or phenyl; cyclohexylamino; phenylamino or naphthylamino, phenyl or naphthyl in each case being substituted by e.g. $C_1$-$C_4$alkyl, $C_1$-$C_4$alkoxy, amino, $C_2$-$C_4$alkanoylamino, carboxy, sulfo or halogen; N-$C_1$-$C_4$alkyl-N-phenylamino, alkyl and phenyl being unsubstituted or substituted as indicated above, or morpholino.

Typical examples of suitable non-reactive amino radicals V and $V_1$ are amino, methylamino, ethylamino, β-hydroxyethylamino, N,N-di-β-hydroxyethylamino, β-sulfoethylamino, cyclo-hexylamino, o-, m- or p-methylphenylamino, o-, m- or p-methoxyphenylamino, o-, m- or p-sulfophenylamino, 2,4- or 2,5-disulfophenylamino, 2- or 3-sulfo-4-methoxyphenylamino, 2- or 3-sulfo-4-methylphenylamino, 4-methyl-2,5-disulfophenylamino, o-carboxyphenylamino, 1- or 2-naphthylamino, 1-sulfo-2-naphthylamino, 1,5-disulfo-2-naphthylamino, 6,8-disulfo-2-naphthylamino, 4,8-disulfo-2-naphthylamino, 4,6,8-trisulfo-2-naphthylamino, 1,5,7-trisulfo-2-naphthylamino, 3,6,8-trisulfo-2-naphthylamino, 1,6-disulfo-2-naphthylamino, N-ethyl-N-phenylamino, N-methyl-N-phenylamino, N-β-sulfoethyl-N-phenylamino, N-β-hydroxyethyl-N-phenylamino, and morpholino.

V and $V_1$ are each independently of the other preferably amino; N-mono- or N,N-di-$C_1$-$C_2$-alkylamino which is unsubstituted or substituted by hydroxy, sulfo or sulfato; cyclohexyl-amino; phenylamino or naphthylamino which is unsubstituted or substituted by methyl, methoxy, carboxy or sulfo; N-$C_1$-$C_2$-alkyl-N-phenylamino which is unsubstituted or substituted in the alkyl moiety by hydroxy or sulfo; or morpholino and, particularly preferably, amino, unsubstituted or sulfo-substituted N-mono- or N,N-di-$C_1$-$C_2$alkylamino; phenylamino which is substitued by 1 to 3 identical radicals of the methyl, methoxy and sulfo group, or 1 - or 2-naphthylamino carrying 1 to 3 sulfo groups.

The variables V and $V_1$ can be different or, preferably, identical.

m, p and q are each independently of one another preferably 1.

$D_1$ defined as radical of formula (2) is preferably a radical of formula

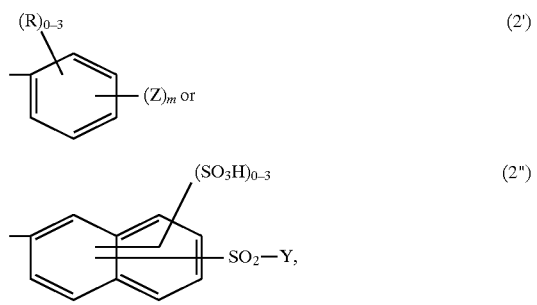

wherein $(R)_{0-3}$ and $(Z)_m$ each have the meanings and preferred meanings given above.

D defined as radical of formula (2a) is preferably a radical of the above formula (2") or a

wherein $(R_1)_{0-3}$ and $(Z')_p$ each have the meanings and preferred meanings given above.

D and $D_1$ defined as radicals of formula (2) and (2a) are each independently of the other particularly preferably a radical of formula

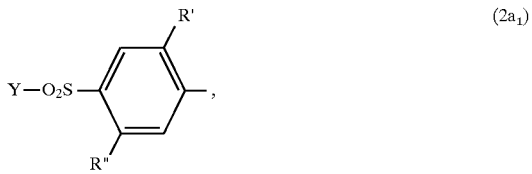

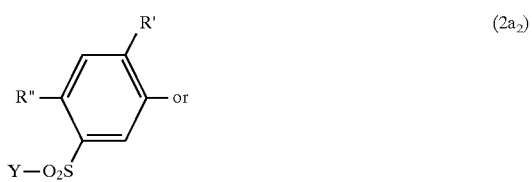

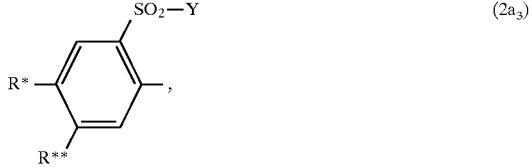

wherein R' is hydrogen, methyl, methoxy or sulfo, R" is hydrogen or methoxy, and one of R* and R** is hydrogen and the other is sulfo, and Y has the meanings and preferred meanings given above.

Illustrative examples of particularly preferred D and $D_1$ of formula (2) and (2a) are: 4-β-sulfatoethylsulfonylphenyl, 3-β-sulfatoethylsulfonylphenyl, 2-sulfo-4-β-sulfatoethylsulfonylphenyl, 2-sulfo-5-β-sulfatoethylsulfonylphenyl, 2-β-sulfatoethylsulfonyl-5-sulfo-phenyl, 2-methoxy-4-β-sulfatoethylsulfonylphenyl, 2-methoxy-5-β-sulfatoethylsulfonylphenyl, 2-methyl-4-β-sulfatoethylsulfonylphenyl, 2,5-dimethoxy-4-β-sulfatoethylsulfonylphenyl and 2-methoxy-5-methyl-4-β-sulfatoethylsulfonylphenyl as well as said radicals in vinylated form.

D and $D_1$, defined as radical of the above formulae (2) and (2a) are each particularly preferably 4-β-sulfatoethylsulfonylphenyl or 4-vinylsulfonylphenyl.

If D is a radical of the above formula (2b), then said radical preferably corresponds to formula

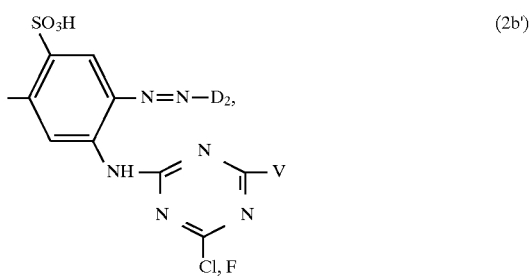

wherein $D_2$ is a radical of the above formula (2a') and, preferably, of formula ($2a_1$), ($2a_2$) or ($2a_3$), and V has the meanings and preferred meanings given above. $D_2$ in formula (2b') is particularly preferably 4-vinylsulfonylphenyl or 4-β-sulfatoethylsulfonylphenyl.

If D is a radical of the above formula (2c), then said radical preferably corresponds to formula

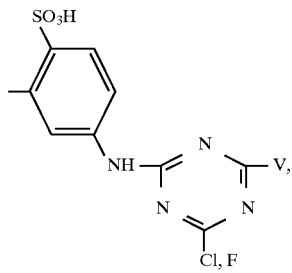

(2c')

wherein V has the meanings and preferred meanings given above.

A group of particularly preferred compounds of the above formula (1) is that, wherein D corresponds to a radical of formula (2b) or, preferably, of formula (2b'). Another group of preferred compounds of the above formula (1) is that, wherein D is a radical of formula (2a) or, preferably, of formula ($2a_1$).

M defined as phenylene radical preferably corresponds to formula

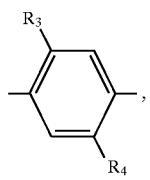

(5)

M defined as phenylene radical is particularly preferably a radical of the above formula (5), wherein $R_3$ is hydrogen, sulfo, methyl or methoxy, and $R_4$ is hydrogen, acetylamino, ureido, methoxy, methyl or a radical of the above formula (3), wherein $T_1$ independently has the meanings and preferred meanings given above for T, and $V_1$ independently has the meanings and preferred meanings given above for V.

M defined as a naphthyl radical is preferably an unsubstituted or sulfo-substituted radical. This radical particularly preferably corresponds to formula

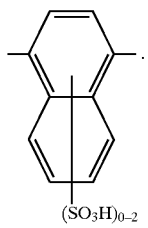

(6)

n is preferably 0.

A preferred embodiment of this invention relates to the compounds of formula

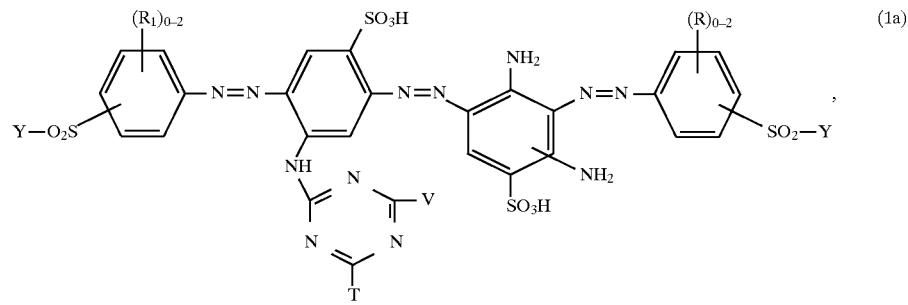

(1a)

wherein $R_3$ is hydrogen, sulfo, $C_1$-$C_4$alkyl or $C_1$-$C_4$alkoxy, and $R_4$ is hydrogen, sulfo, $C_1$-$C_4$-alkyl, $C_1$-$C_4$alkoxy, $C_2$-$C_4$alkanoylamino, ureido or a radical of the above formula (3). Formula (5) will be understood to be such that the left bond is directed to the diamino-benzenesulfonic acid and the right bond to $D_1$.

wherein $(R)_{0-2}$ and $(R_1)_{0-2}$ are identical and are each 0 to 2 identical or different radicals of the sulfo, methyl and methoxy group, Y is vinyl or β-sulfatoethyl, T is fluoro or, preferably, chloro, and V is amino; N-mono- or N,N-di-$C_1$-$C_2$alkylamino which is unsubstituted or substituted by hydroxy, sulfo or sulfato; cyclohexylamino; phenylamino or naphthylamino which is unsubstituted or substituted by methyl, methoxy, carboxy or sulfo; N-$C_1$-$C_2$alkyl-N-phenylamino which is unsubstituted or substituted in the alkyl moiety by hydroxy or sulfo, or morpholino.

A particularly preferred embodiment of this invention relates to compounds of formula

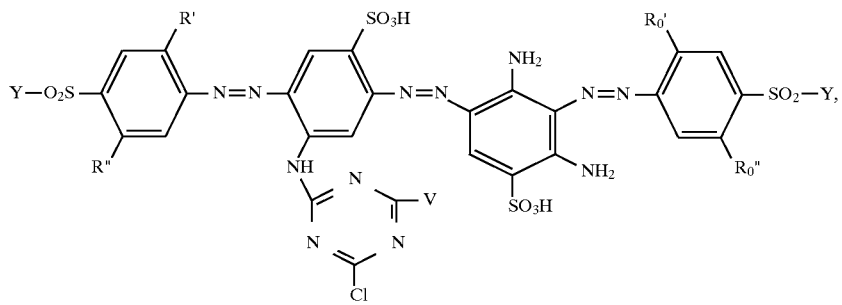

wherein R' and $R^{0'}$ are each independently of the other hydrogen, methyl, methoxy or sulfo, R" and $R_0$" are each independently of the other hydrogen or methoxy, Y is vinyl or β-sulfato- ethyl, and V is amino, unsubstituted or sulfo-substituted N-mono- or N,N-di-$C_1$-$C_2$-alkyl-amino; phenylamino which is substituted by 1 to 3 identical radicals of the methyl, methoxy and sulfo group, or 1- or 2-naphthylamino carrying 1 to 3 sulfo groups. A particularly preferred embodiment of this invention relates to compounds of the above formula (1 b), wherein R', $R_0$', R" and $R_0$" are each hydrogen.

Sulfo groups present in the compounds of formula (1) can generally present in the form of free acid (-$SO_3H$) as well as in any salt form, for example alkali metal salt, alkaline earth metal salt or ammonium salt, or in the form of a salt of an organic amine such as the sodium, potassium, lithium or ammonium salt, the salt of triethanolamine or the mixed salt of two or several different cations, e.g. the Na/Li, Na/$NH_4$ or Na/Li/$NH_4$ mixed salt.

$C_1$-$C_4$Alkyl is generally methyl, ethyl, n- or isopropyl or n-, iso-, sec- or tert-butyl, preferably methyl or ethyl and, particularly preferably, methyl. $C_1$-$C_4$Alkoxy is generally methoxy, ethoxy, n- or isopropoxy or n-, iso-, sec- or tert-butoxy, preferably methoxy or ethoxy and, particularly preferably, methoxy. Halogen is generally e.g. fluoro, chloro or bromo, preferably chloro or fluoro and, particularly preferably, chloro. Typical examples of $C_2$-$C_4$-alkanoylamino are propionylamino or, preferably, acetylamino.

In one of its aspects, the invention also relates to a process for the preparation of reactive dyes of formula (1), which comprises reacting about 1 molar equivalent each of a compound of formulae

  (7)

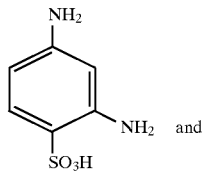 and  (8)

  (9)

wherein the variables have the meanings given above, with each other by diazotising and coupling in any order.

The diazotisation of the compounds of formulae (7) and (9) is carried out in conventional manner by treating them in mineral acid solution, typically in a hydrochloric solution with a nitrite, typically sodium nitrite, at low temperature, e.g. in the range from 0° to 5° C.

The order of the couplings of the diazotised compounds of formulae (7) and (9) with the compound of formula (8) determines the position of the second amino group in the compounds of formula (1). The first diazo component is usually coupled in the 6-position and the second diazo component in the 2-position of the 1,3-diaminobenzene-4-sulfonic acid. The couplings are preferably carried out at a neutral to slightly acid pH, typically at pH 3 to 7 and, preferably, at 4.5 to 6.5, and at low temperatures, e.g. in the range from 0° to 30° C.

The compounds of formula (7), wherein D is a radical of formula (2b), are known, inter alia, from EP-A-647683. The other compounds of formula (7) as well as the compounds of formulae (8) and (9) are known or can be prepared in general analogy to known compounds. The introduction of a pyridinium radical T or $T_1$, where required, is usually carried out following a condensation reaction of the corresponding cyanuric halides.

The novel compounds of formula (1) are fibre-reactive. Fibre-reactive compounds will be understood to mean those compounds which are capable of reacting with the hydroxyl groups of cellulose, with the amino, carboxy, hydroxy or thiol groups in wool and silk, or with the amino groups and, where appropriate, with the carboxyl groups of synthetic polyamides with formation of covalent chemical bonds.

The novel compounds of formula (1) are suitable for dyeing and printing a very wide range of materials, such as hydroxyl group-containing or nitrogen-containing fibre materials. Typical examples of such materials are silk, leather, wool, polyamide fibres and polyurethanes. The novel dyes are especially suitable for dyeing and printing cellulosic fibre materials of all kinds. Such cellulosic fibre materials are typically natural cellulosic fibres such as cotton, linen and hemp, as well as cellulose and regenerated cellulose, preferably cotton. The novel dyes are also suitable for dyeing or printing cellulosic blends, for example blends of cotton with polyamide fibres or, in particular, of cotton/polyester fibres.

The dyes of this invention may be applied to and fixed on the fibre material in different manner, preferably in the form of aqueous dye solutions and printing pastes. The novel dyes are suitable both for the exhaust process and for dyeing by the pad dyeing process, in which the goods are impregnated with aqueous, and optionally salt-containing, dye solutions, and the dyes are fixed after treatment with alkali, or in the presence of alkali, with or without the application of heat, or by storing for several hours at room temperature. After fixation, the dyeings or prints are thoroughly rinsed with cold and hot water, if necessary with the addition of an agent which acts as a dispersant and promotes the diffusion of unfixed dyes.

The dyes of this invention are distinguished by high reactivity, good fixation and excellent build-up. They can therefore be applied by the exhaust process at low dyeing temperatures and require only short steaming times when used in the pad-steam process. The degree of fixation is high, and unfixed dye can be readily washed off. The difference between degree of exhaustion and degree of fixation is remarkably small, i.e. the soap loss is very small. The dyes of this invention and, in particular, the novel dye mixtures are also particularly suitable for printing, especially on cotton, and for printing nitrogen-containing fibres, e.g. wool, silk, or blends containing wool or silk.

The dyeings and prints obtained with the dyes of this invention have excellent tinctorial strength and excellent dye-fibre bond stability both in the acid and in alkaline range, and they also have good lightfastness and excellent wetfastness properties such as fastness to washing, water, sea-water, cross-dyeing and perspiration, as well as good fastness to pleating, ironing and rubbing.

The invention is illustrated by the following Examples, in which temperatures are given in degrees Celsius and parts and percentages are by weight, unless otherwise stated. The ratio of parts by weight to parts by volume is the same as that of the kilogram to the liter.

Example 1: 36.9 parts of cyanuric chloride are stirred into 150 parts of ice/water and a small amount of a wetting agent. A solution consisting of 25.25 parts of taurine in 50 parts of water are run into this mixture at 0°–2° C. over 40 min. and the mixture is condensed at pH 7–8 by the dropwise addition of 2N sodium hydroxide solution. The batch is stirred at 0°–5° C. and pH 7–7.5 until no cyanuric chloride can be detected anymore. Subsequently, a neutral solution of 39.48 parts of 1,3-phenylendiamine-4-sulfonic acid in 100 parts of water is added. The batch is condensed at a temperature in the range of 5°–20° C. and the pH is kept at 8 –9 by the addition of 2N sodium hydroxide solution. When the condensation is complete, the reaction solution is salted out with KCI and filtered, and the product is washed with concentrated Kcl solution giving, after drying, the intermediate of formula

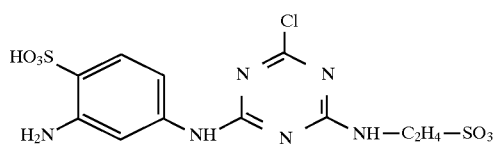

89.3 parts of this compound are made into a slurry in 400 parts of water. 41.4 parts of 2(4-aminophenylsulfonyl)ethyl hydrogensulfate, diazotised by known method, are then added at 0°–50° C. over 10 minutes and the pH is kept at 6 –8.5 with a 20% soda solution. After coupling is complete, the yellow dye is precipitated with KCI, the resulting suspension is filtered and the product is dried under vacuum, giving the monoazo compound of formula

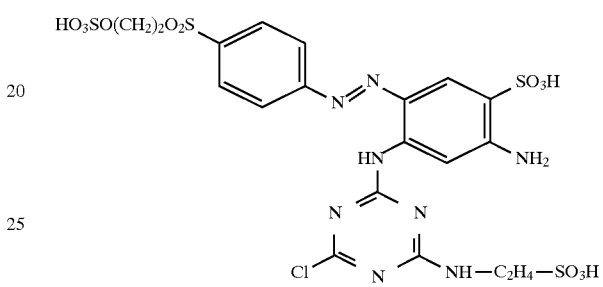

123 parts of this compound are dissolved in 700 parts of water and diazotised by conventional method with sodium nitrite and HCI at 0°–5° C. This diazo suspension is added over 30 minutes at 2°–5° C. to a neutral solution of 25.1 parts of 1,3-phenylenediamine-4-sulfonic acid in 300 parts of water. The pH is kept at 4.5 –5.5. with a 20% soda solution. After coupling is complete, the dye is precipitated with KCI and the resulting suspension is filtered, giving a brown dye of the following structure.

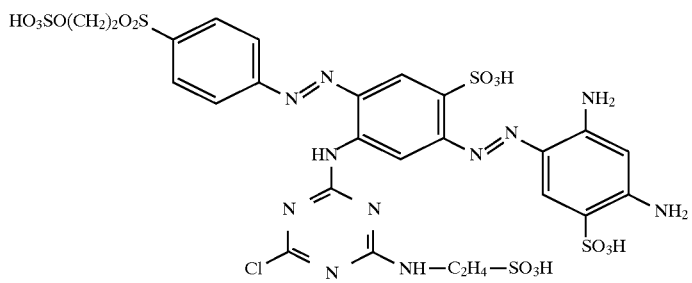

106 parts of this dye are dissolved in 400 parts of water. 32.3 parts of 2(4-amino-phenyl-sulfonyl)ethyl hydrogensulfate, diazotised by conventional method with sodium nitrite and HCI, are then added at 0°–10° C. over 15 minutes. The pH is kept at 5.5 –7.0 with a 20% soda solution. After coupling is complete, precipitation is carried out with KCI and the batch subjected to filtration giving, after drying, the dye of formula

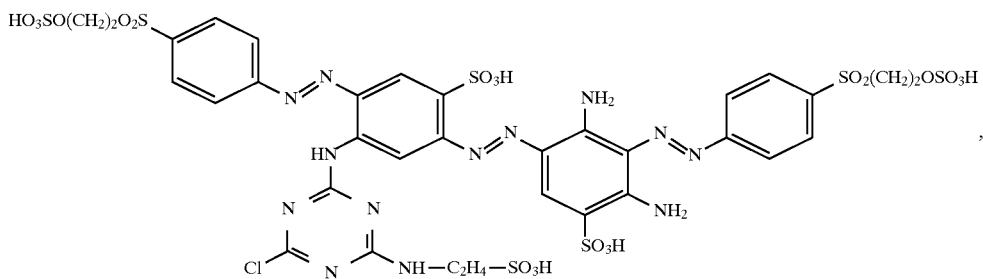

which dyes cotton in a brown shade having good allround fastness properties.

Example 2: The procedure of Example 1 is repeated, but replacing taurine with an equivalent amount of ammonium chloride, giving the dye of formula

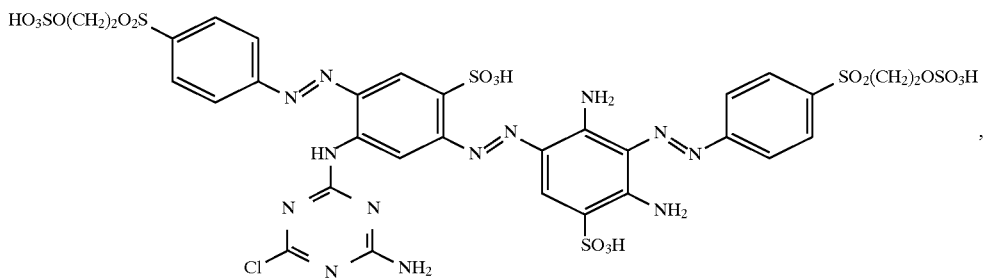

which dyes cotton in a brown shade having good allround fastness properties.

Example 3–36: In general accordance with the procedure described in Example 1, the following reactive dyes can be prepared, which dye cotton in the indicated shades with good allround fastness properties.

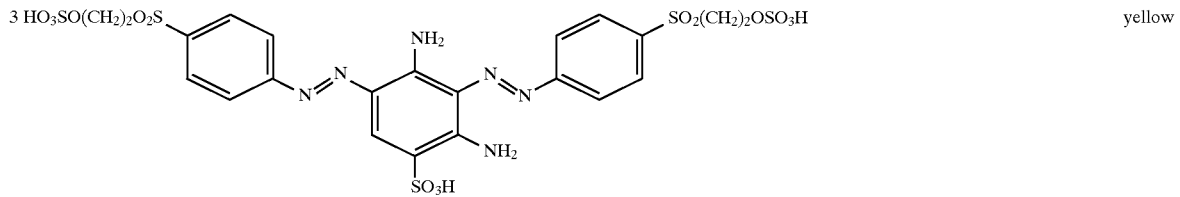

yellow

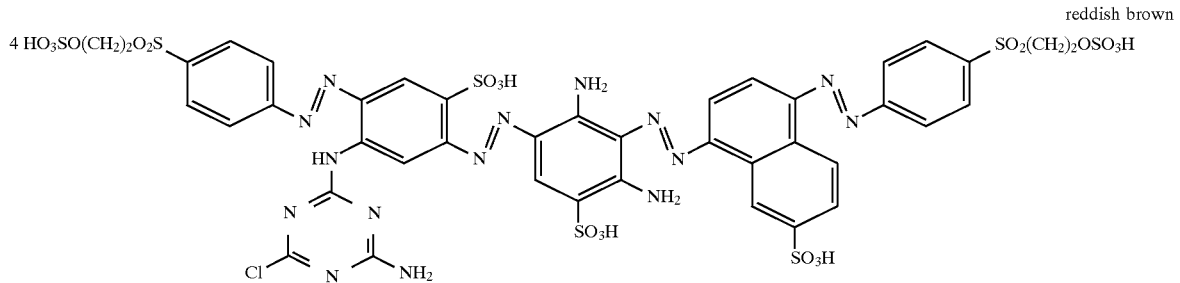

reddish brown

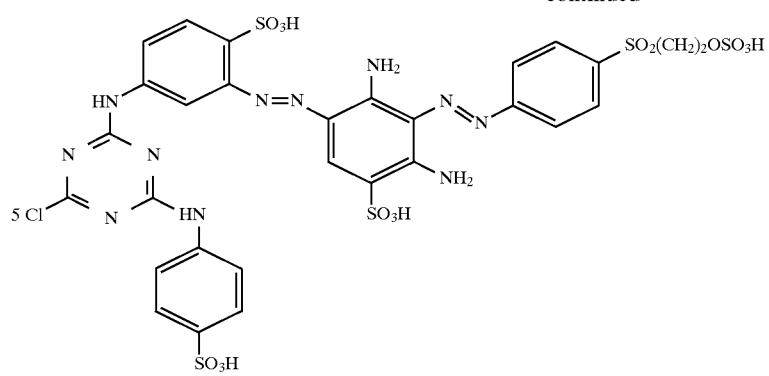
yellow
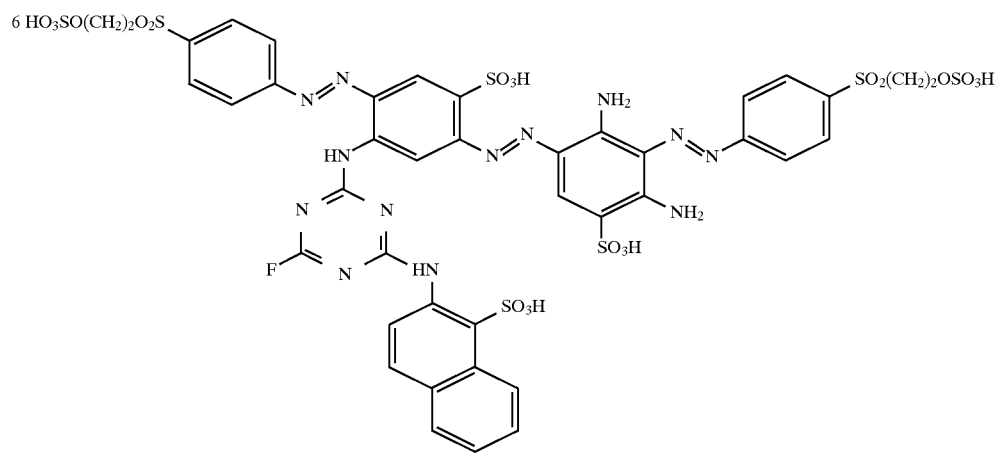
brown
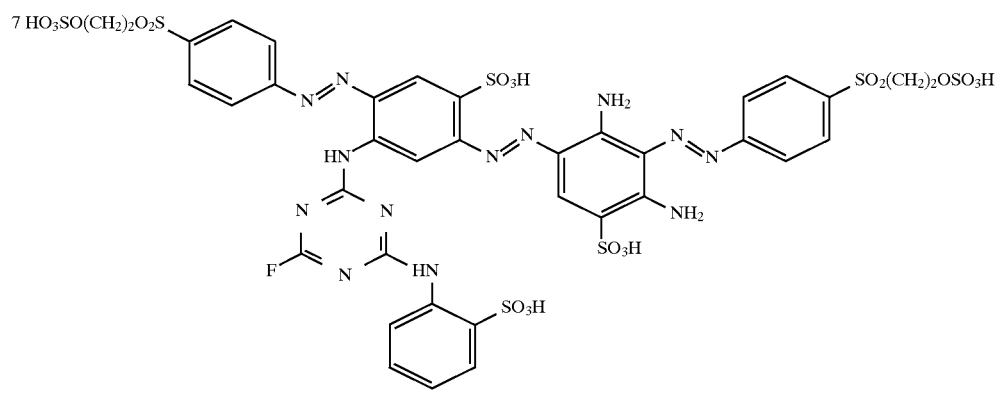
brown
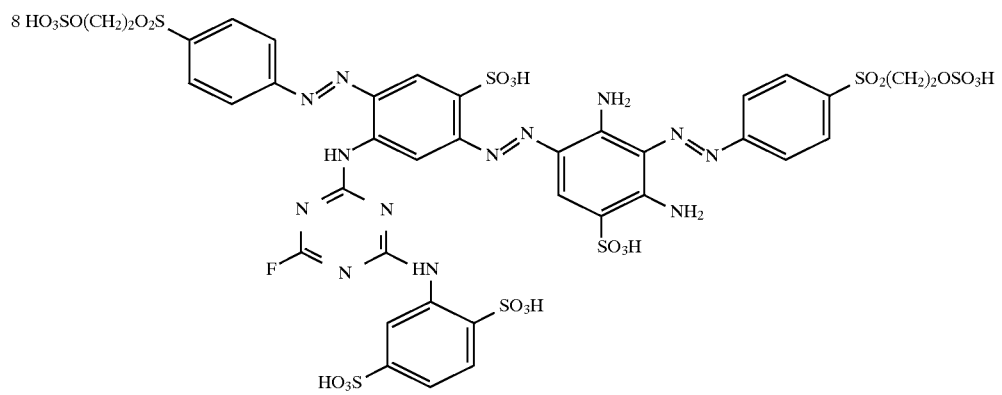

9 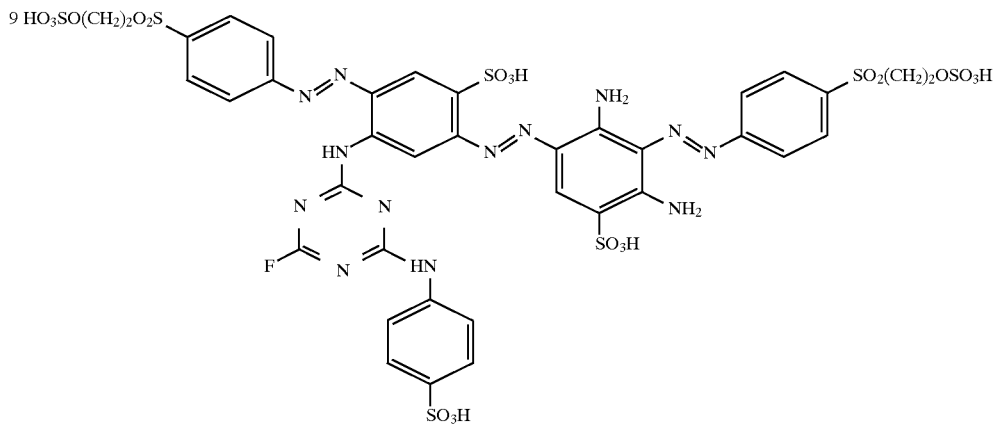 brown
10 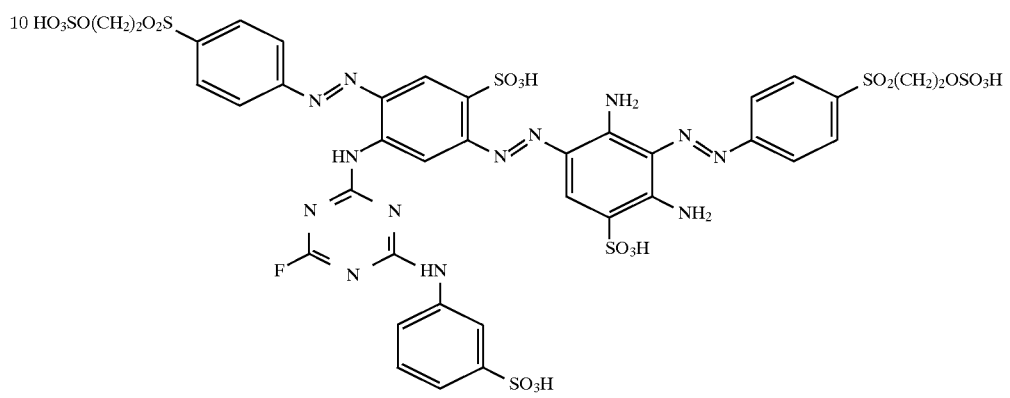 brown
11 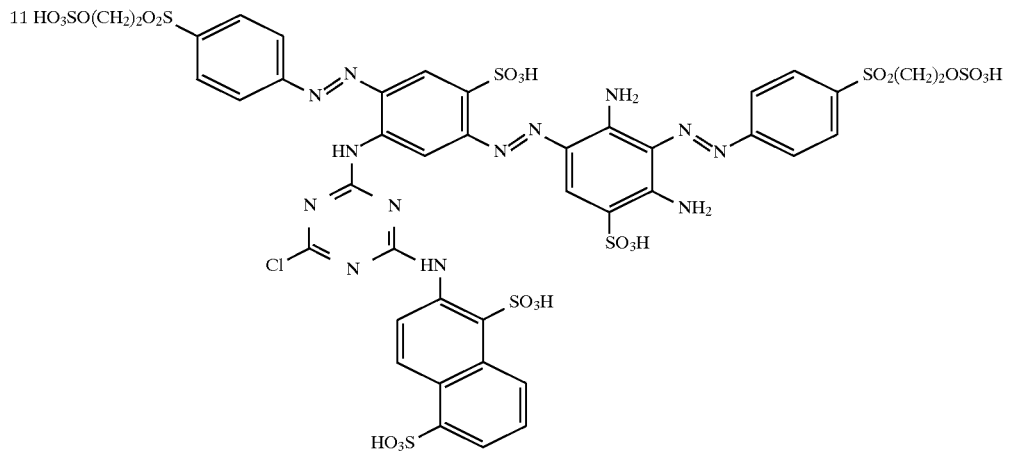 brown
12 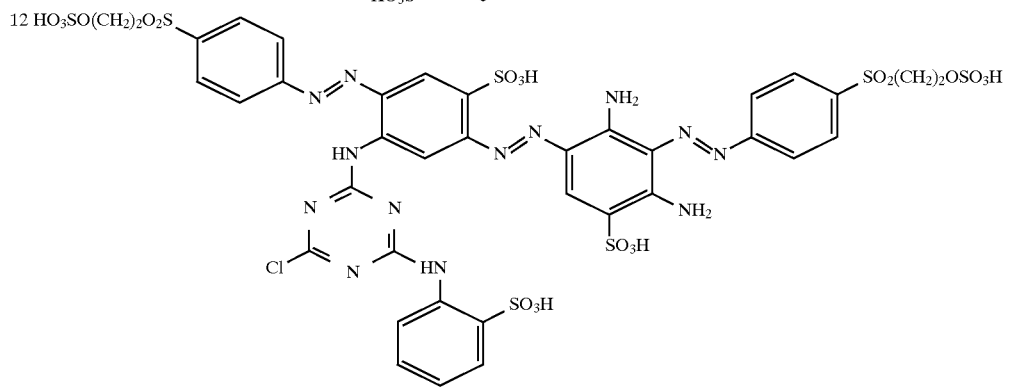 brown

13 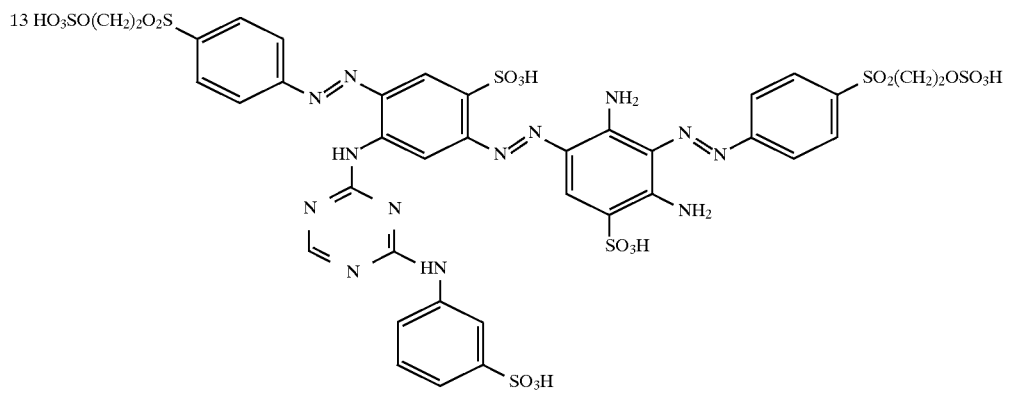 brown
14 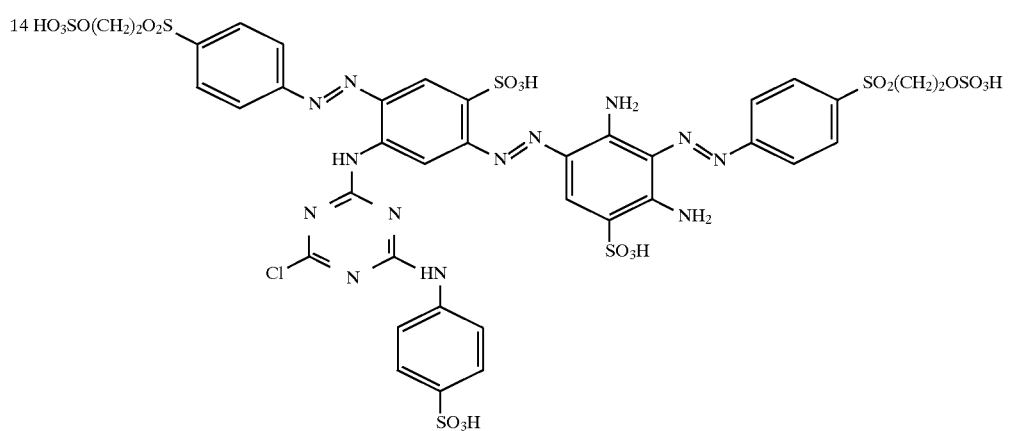 brown
15 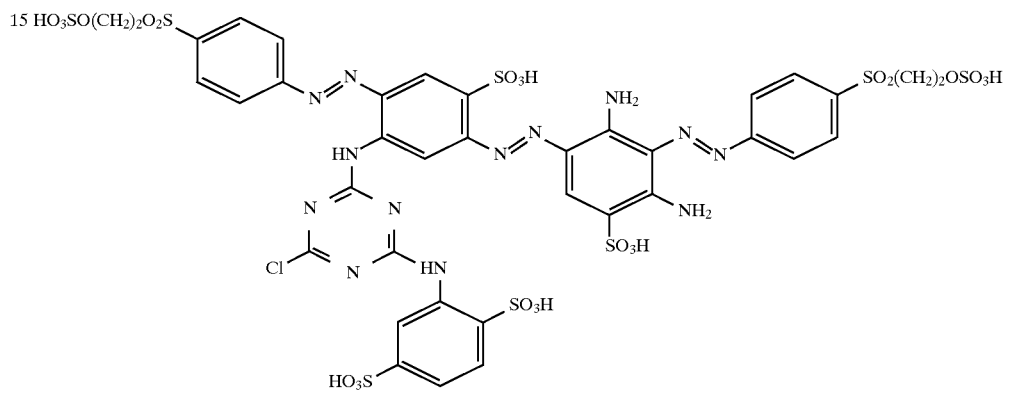 brown
16 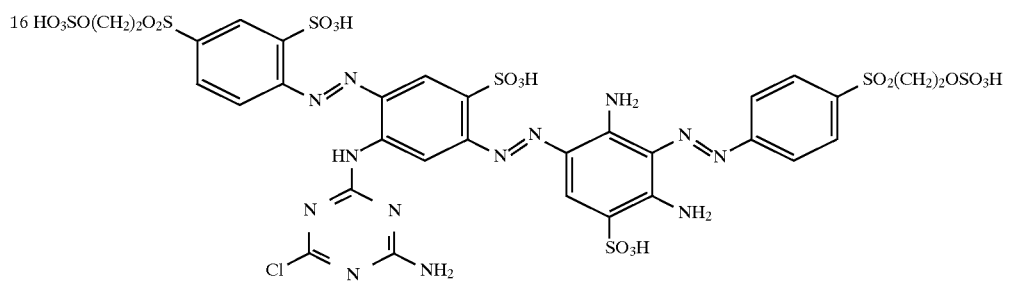 brown

-continued
17 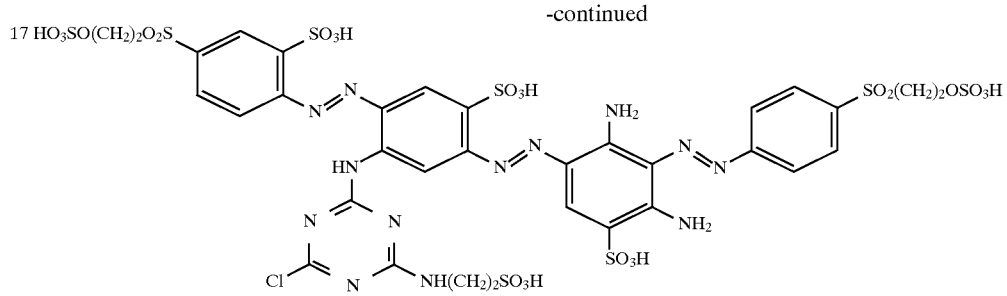 brown
18 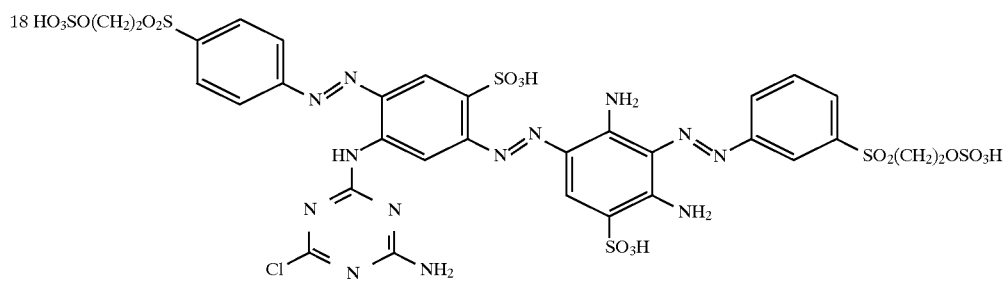 brown
19 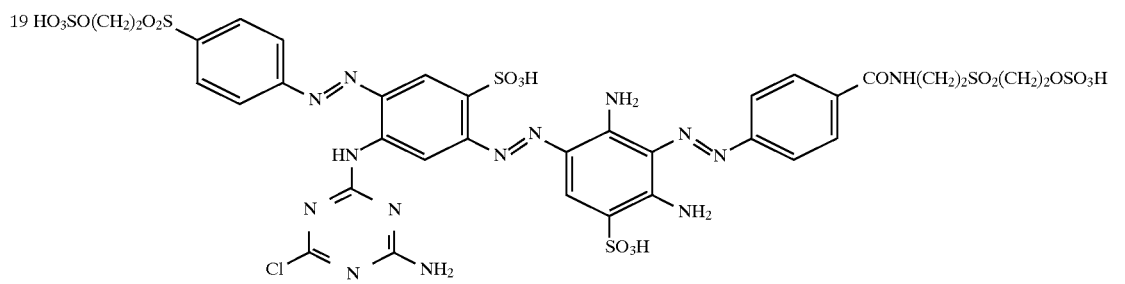 brown
20 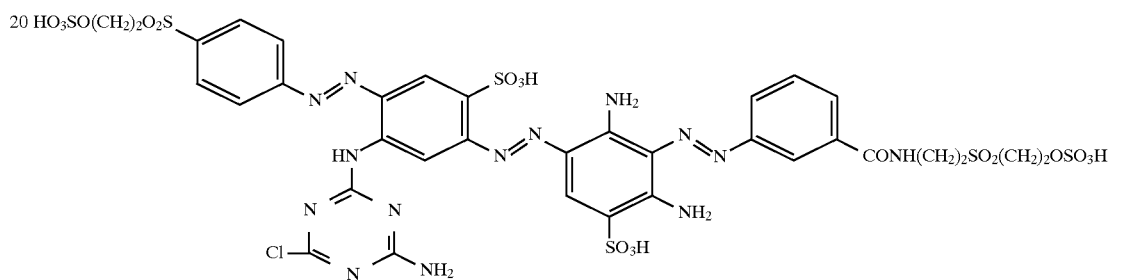 brown
21 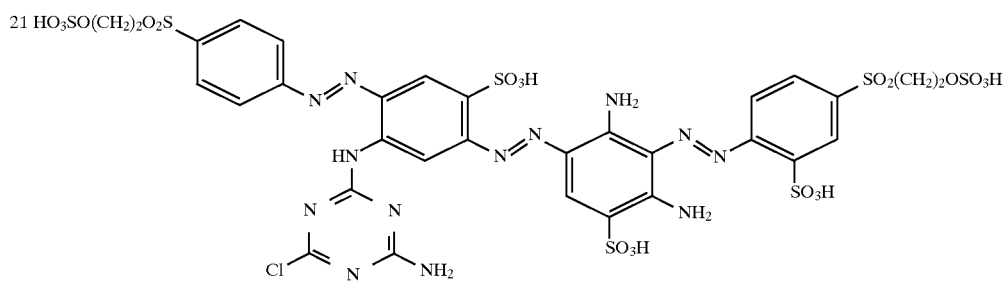 brown
22 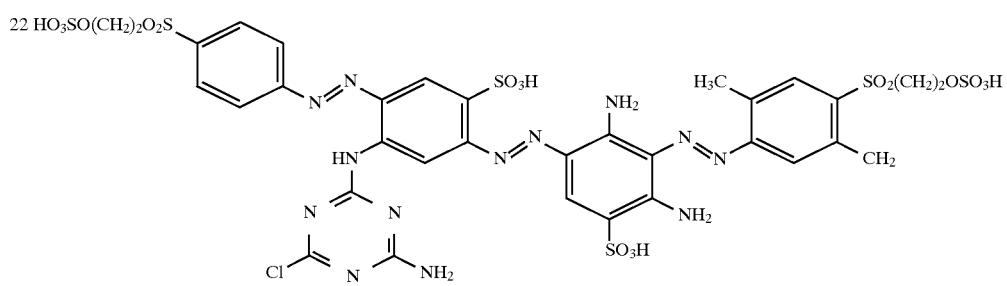 brown

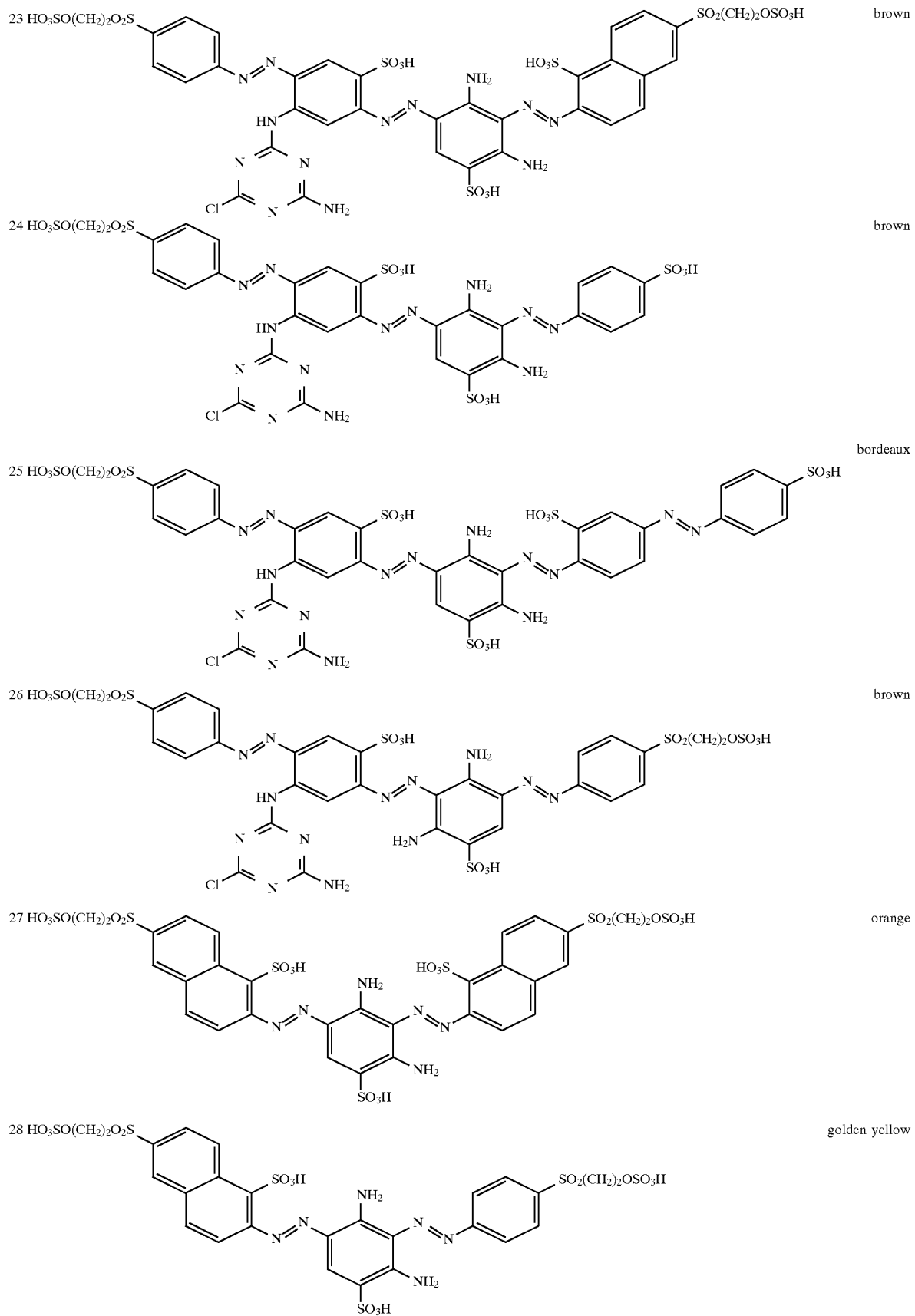

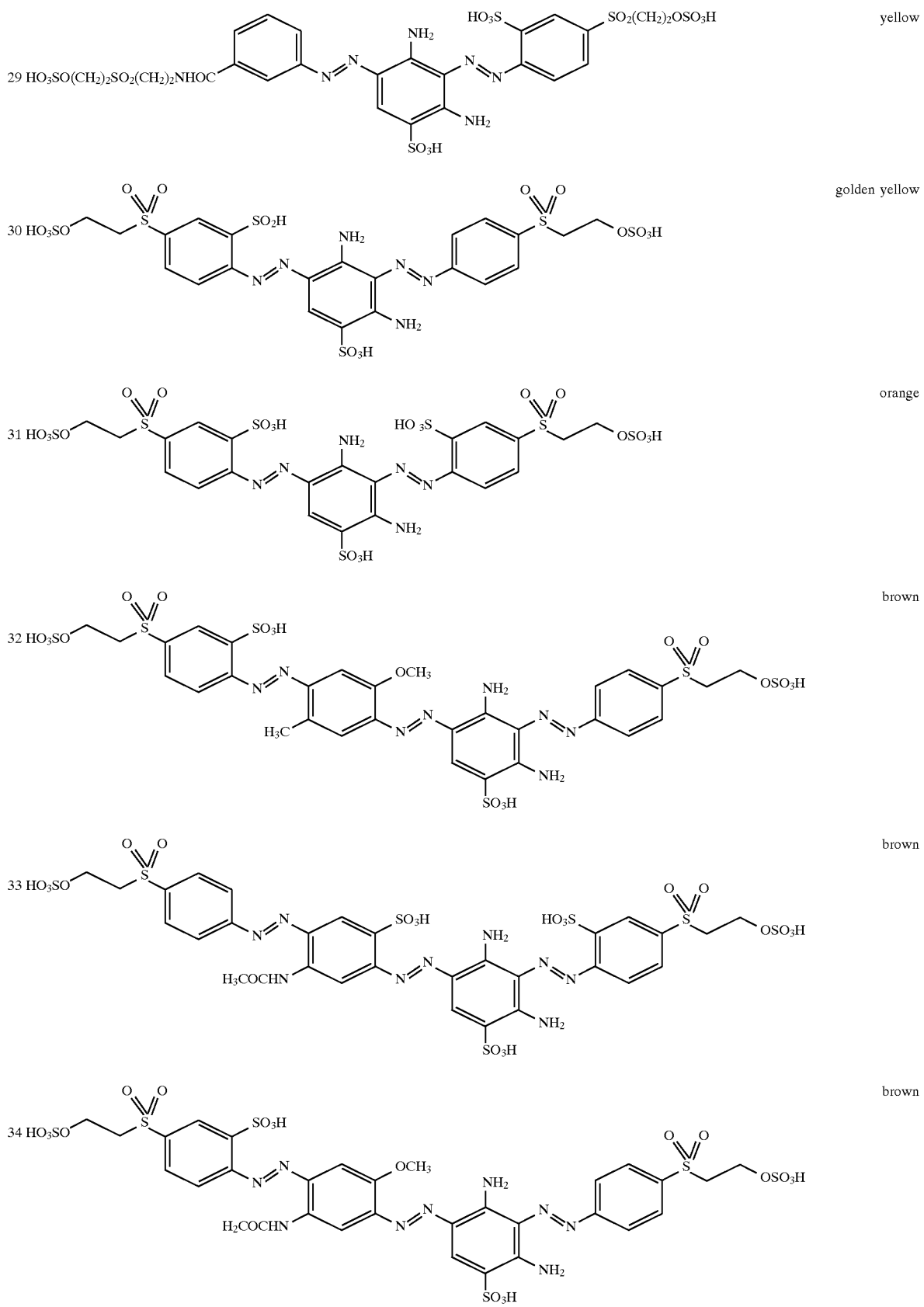

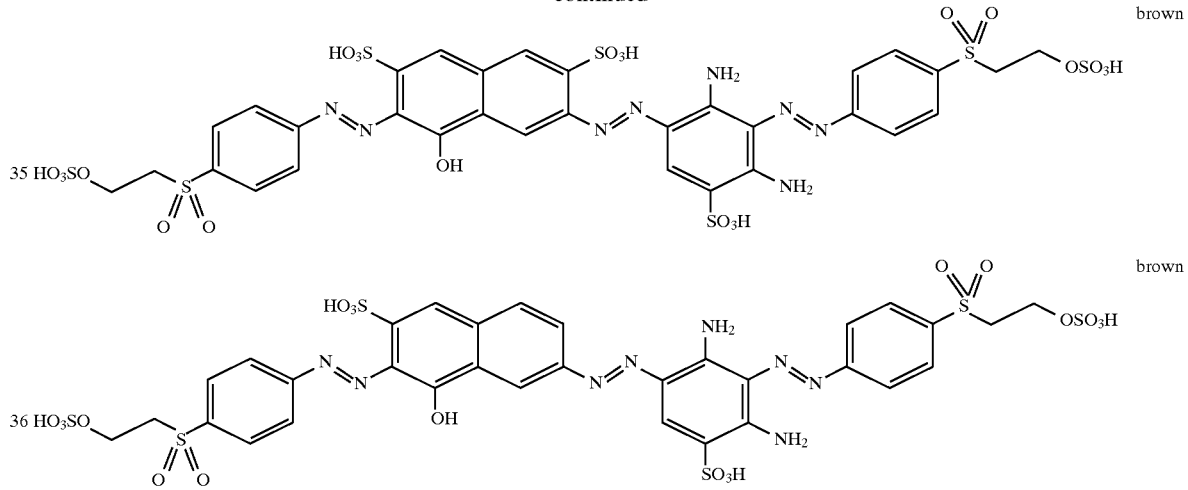

Dyeing Procedure I: 2 parts of the dye obtained in Example 1 are dissolved in 400 parts of water. To this solution are added 1500 parts of a solution which contains 53 g/l of sodium chloride. 100 parts of cotton fabric are put into this dyebath at 40° C. and, after 45 minutes, 100 parts of a solution containing 16 g/l of sodium hydroxide and 20 g/l of calcined sodium carbonate are added. The temperature of the dyebath is kept for another 45 minutes at 40° C. The dyed goods are then rinsed, soaped at the boil for a quarter of an hour with an non-ionic detergent, rinsed again and dried.

Dyeing Procedure II: 2 parts of the reactive dye obtained in Example 1 are dissolved in 400 parts of water. To this solution are added 1500 parts of a solution which contains 53 g/l of sodium chloride. 100 parts of cotton fabric are put into this dyebath at 35° C. and, after 20 minutes, 100 parts of a solution containing 16 g/l of sodium hydroxide and 20 g/l of calcined sodium carbonate are added. The temperature of the dyebath is kept for another 15 minutes at 35° C. The temperature is then raised over 20 minutes to 60° C. and kept at this temperature for a further 35 minutes. The dyed goods are then rinsed, soaped at the boil for a quarter of an hour with a non-ionic detergent, rinsed again and dried.

Dyeing Procedure III: 8 parts of the reactive dye obtained in Example 1 are dissolved in 400 parts of water. To this solution are added 1400 parts of a solution which contains 100 g/l of sodium sulfate. 100 parts of cotton fabric are put into this dyebath at 25° C. and, after 10 minutes, 200 parts of a solution containing 150 g/l of trisodium phosphate are added. The temperature of the dyebath is then raised over 10 minutes to 60° C. and is kept at this temperature for a further 90 minutes. The dyed goods are then rinsed, soaped at the boil for a quarter of an hour with a non-ionic detergent, rinsed again and dried.

Dyeing Procedure IV: 4 parts of the reactive dye obtained in Example 1 are dissolved in 50 parts of water. To this solution are added 50 parts of a solution which contains 5 g/l of sodium hydroxide and 20 g/l of calcined soda. A cotton fabric is padded with the solution so obtained to a pick-up of 70%, rolled up and stored in this manner for 3 hours at room temperature. The dyed fabric is then rinsed, soaped at the boil for a quarter of an hour with a non-ionic detergent, rinsed again and dried.

Dyeing Procedure V: 6 parts of the reactive dye obtained in Example 1 are dissolved in 50 parts of water. To this solution are added 50 parts of a solution which contains 16 g/l of sodium hydroxide and 0.041 of sodium silicate (38°bé). A cotton fabric is padded with the solution obtained to a pick-up of 70%, rolled up and stored in this manner for 10 hours at room temperature. The dyed fabric is then rinsed, soaped at the boil for a quarter of an hour with a non-ionic detergent, rinsed again and dried.

Dyeing Procedure VI: 2 parts of the reactive dye obtained in Example 1 are dissolved in 100 parts of water with the addition of 0.5 parts of sodium m-nitrobenzenesulfonate. A cotton fabric is impregnated with the solution so obtained to a pick-up of 75% and then dried. The fabric is then impregnated with a 20° C. solution which contains 4 g/l of sodium hydroxide and 300 g of sodium chloride and then pinched off to a pick-up of 75%. The dyed fabric is steamed for 30 seconds at 100° to 102° C., rinsed, soaped at the boil for a quarter of an hour with a non-ionic detergent, rinsed again and dried.

Dyeing Procedure VII: 0.1 part of the dye obtained in Example 1 is dissolved in 200 parts of demineralised water with the addition of 0.5 part of Glauber's salt, 0.1 part of a levelling agent and 0.5 part of sodium acetate. The batch is then adjusted to pH 5.5 with 80% acetic acid. The dye bath is heated to 50° C. over 10 minutes and then 10 parts of a wool fabric are put into it. The dye bath is heated to 100° C. over c. 50 minutes and dyeing is carried out for 60 minutes at this temperature. The dye bath is then cooled to 90° C. and the dyed fabric is taken out. The wool fabric is rinsed with warm and cold water and then spun and dried, giving a brown dyeing having very good fastness to light and wet treatment.

Printing Procedure I: 3 parts of the reactive dye obtained in Example 1 are sprinkled, with rapid stirring, into 100 parts of a stock thickening which contains 50 parts of 5% sodium alginate thickening, 27.8 parts of water, 20 parts of urea, 1 part of sodium m-nitrobenzene-sulfonate and 1.2 parts of sodium hydrogen carbonate. A cotton fabric is printed with the printing paste so obtained and dried. The printed fabric is steamed for 2 minutes at 102° C. in saturated steam, then rinsed, if necessary soaped at the boil, then rinsed once more and subsequently dried.

Printing Procedure II: 5 parts of the reactive dye obtained in Example 1 are sprinkled, with rapid stirring, into 100 parts of a stock thickening which contains 50 parts of 5% sodium alginate thickening, 36.5 parts of water, 10 parts of urea, 1 part of sodium m-nitrobenzene-sulfonate and 2.5 parts of sodium hydrogen carbonate. A cotton fabric is printed with the printing paste so obtained, the stability of which meets the technical requirements, and dried. The printed fabric is stamed for 8 minutes at 102° C. in saturated steam, then rinsed, if necessary soaped at the boil, then rinsed once more and subsequently dried.

What is claimed is:

1. A compound of formula

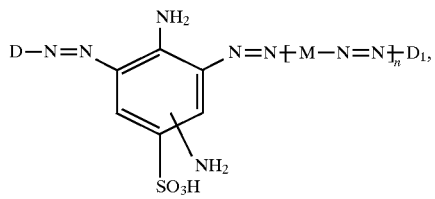 (1)

wherein $D_1$ is a radical of formula

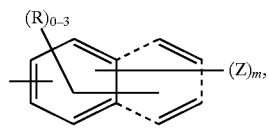 (2)

D is a radical of formula

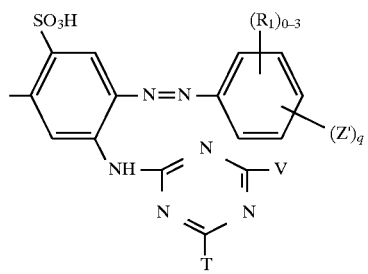 (2b)

or

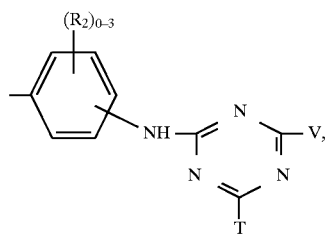 (2c)

M is a phenylene radical which is unsubstituted or substituted by sulfo, $C_1$-$C_4$alkyl, $C_1$-$C_4$alkoxy, halogen, $C_2$-$C_4$alkanoylamino, ureido or a radical of formula

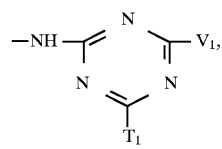 (3)

or a naphthylene radical which is unsubstituted or substituted by sulfo or hydroxy, $(R)_{0-3}$, $(R_1)_{0-3}$ and $(R_2)_{0-3}$ are each independently of one another 0 to 3 identical or different radicals selected from the group consisting of sulfo, $C_1$-$C_4$alkyl, $C_1$-$C_4$alkoxy and halogen, T and $T_1$ are each independently of the other halogen or 1-pyridinyl which is unsubstituted or substituted by carbamoyl or carboxy, V and $V_1$, are each independently of the other a non-reactive amino radical, Z and Z' are each independently of the other a radical of formula —SO$_2$—Y (4a)

or

—CONH—(CH$_2$)r—SO2—Y (4b),

Y is vinyl or a —CH$_2$—CH$_2$—U radical, and U is a leaving group, r is an integer from 1 to 6, and n, m, and q are each independently of one another a number from 0 to 1, with the proviso that m is 1 if D is a radical of formula (2c) or a radical of formula (2b) wherein q is 0.

2. A compound according to claim 1, wherein Y is vinyl, β-chloroethyl, β-sulfatoethyl, β-thiosulfatoethyl, β-acetoxyethyl, β-phenoxyethyl or β-phosphatoethyl.

3. A compound according to claim 1, wherein n is 0, and m is 1.

4. A compound according to claim 1, wherein D, is a radical of formula

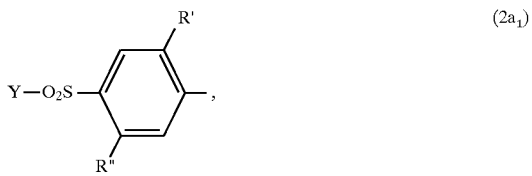 (2a$_1$)

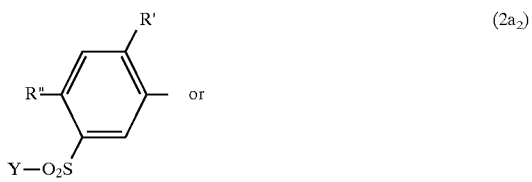 (2a$_2$)

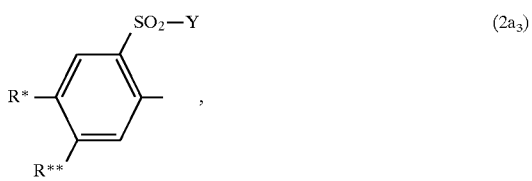 (2a$_3$)

wherein R' is hydrogen, methyl, methoxy or sulfo, R" is hydrogen or methoxy, and one of R* and R** is hydrogen and the other is sulfo, and Y is vinyl, β-chloroethyl, β-sulfatoethyl, β-thiosulfatoethyl, β-acetoxyethyl, β-phenoxyethyl or β-phosphatoethyl.

5. A compound according to claim 1, wherein D is a radical of formula (2b).

6. A compound according to claim 1, wherein D is a radical of formula

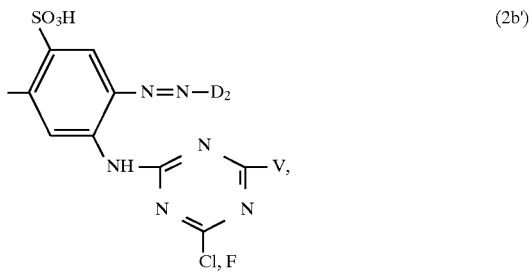 (2b')

wherein $D_2$ is a radical of formula

 (2a')

wherein $(R_1)_{0-3}$ is 0 to 3 radicals selected from the group consisting of sulfo, methyl and methoxy, Z is a -SO$_2$-Y radical, Y is vinyl, β-chloroethyl, β-sulfatoethyl, β-thiosulfatoethyl, β-acetoxyethyl, β-phenoxyethyl or β-phosphatoethyl, m is 1, and V is amino; N-mono- or N,N-di-$C_1$-$C_2$-alkylamino which is unsubstituted or substituted by hydroxy, sulfo or sulfato; cyclohexylamino; phenylamino or naphthylamino which is unsubstituted or substituted by methyl, methoxy, carboxy or sulfo; N-$C_1$-$C_2$alkyl-N-phenylamino which is unsubstituted or substituted in the alkyl moiety by hydroxy or sulfo; or morpholino.

7. A compound according to claim 6, wherein $D_1$, and $D_2$ are each independently of the other 4-vinylsulfonylphenyl or 4β-sulfatoethylsulfonyl.

8. A compound according to claim 1 of formula

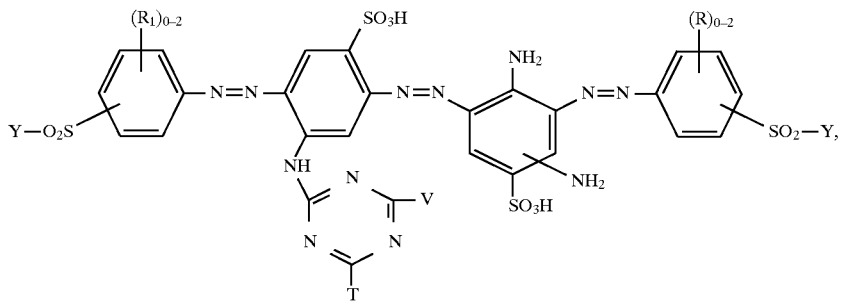

wherein $(R)_{0-2}$ and $(R_1)_{0-2}$ are identical and are each 0 to 2 identical or different radicals selected from the group consisting of sulfo, methyl and methoxy, Y is vinyl or β-sulfatoethyl, T is fluoro or chloro, and V is amino; N-mono- or N,N-di-$C_1$-$C_2$alkylamino which is unsubstituted or substituted by hydroxy, sulfo or sulfato; cyclohexylamino; phenylamino or naphthylamino which is unsubstituted or substituted by methyl, methoxy, carboxy or sulfo; N-$C_1$-$C_2$alkyl-N-phenylamino which is unsubstituted or substituted in the alkyl moiety by hydroxy or sulfo; or morpholino.

9. A compound according to claim 1 of formula

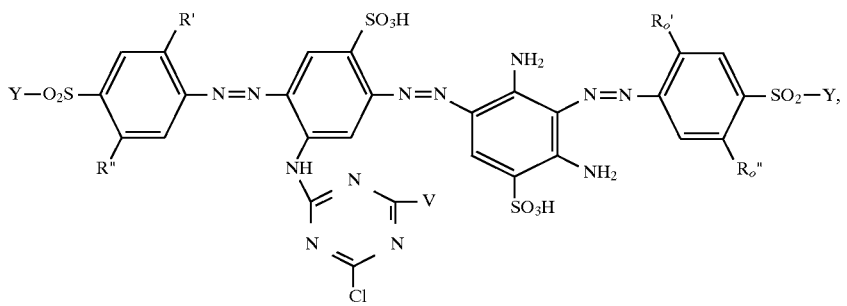

wherein R' and $R_0$' are each independently of the other hydrogen, methyl, methoxy or sulfo, R" and $R_0$' are each independently of the other hydrogen or methoxy, Y is vinyl or β-sulfato-ethyl, and V is amino, unsubstituted or sulfo-substituted N-mono- or N,N-di-$C_1$-$C_2$-alkyl-amino; phenylamino which is substituted by 1 to 3 identical radicals selected from the group consisting of methyl, methoxy and sulfo, or 1- or 2-naphthylamino carrying 1 to 3 sulfo groups.

10. A compound according to claim 9, wherein R', $R_0$', R" and $R_0$" are each hydrogen.

11. A process for the preparation of a compound of formula (1) according to claim 1, which comprises reacting about 1 molar equivalent each of a compound of formulae

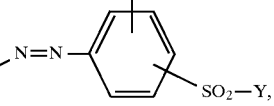

wherein the variables have the meanings given in claim 1, with each other by diazotising and coupling in any order.

12. A process for dyeing or printing hydroxyl group-containing or nitrogen-containing fibre material, which process comprises the step of applying to said fibre material a tinctorially effective amount of a compound of formula (1) according to claim 1.

13. A process according to claim 12 wherein said fibre material is cellulosic fibre material.

14. A compound of formula

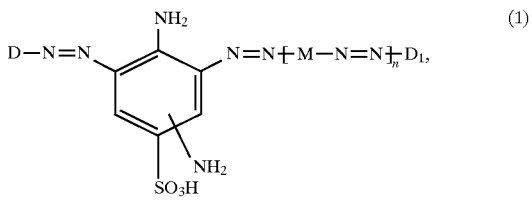

wherein $D_1$ is a radical of formula

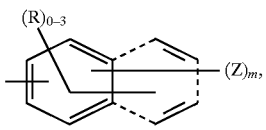 (2)

D is a radical of formula

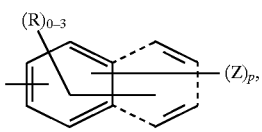 (2a)

M is a phenylene radical which is unsubstituted or substituted by sulfo, $C_1$-$C_4$alkyl, halogen, $C_2$-$C_4$alkanoylamino, ureido or a radical of formula

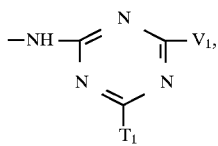 (3)

or a naphthylene radical which is unsubstituted or substituted by sulfo, $(R)_{0-3}$ and $(R_1)_{0-3}$ are each independently of one another 0 to 3 identical or different radicals selected from the group consisting of sulfo, $C_1$-$C_4$alkyl and halogen, $T_1$ is halogen or 1-pyridinyl which is unsubstituted or substituted by carbamoyl or carboxy, $V_1$ is a non-reactive amino radical, Z and Z' are each independently of the other a radical of formula

 -$SO_2$-Y (4a) or

 -CONH-$(CH_2)_r$-$SO_2$-Y (4b),

Y is vinyl or a -$CH_2$-$CH_2$-U radical, and U is a leaving group, r is an integer from 1 to 6, and n, m and p are each independently of one another a number from 0 to 1, with the proviso that m is 1 if D is a radical of formula (2a) wherein p is 0, and with the proviso that D and $D_1$ have different meanings, if n is 0.

15. A compound according to claim 14, wherein Y is vinyl, β-chloroethyl, β-sulfatoethyl, β-thiosulfatoethyl, β-acetoxyethyl, β-phenoxyethyl or β-phosphatoethyl.

16. A compound according to claim 14, wherein n is 0, and m is 1.

17. A compound according to claim 14, wherein $D_1$ is a radical of formula

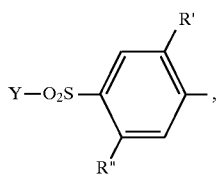 ($2a_1$)

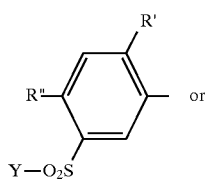 ($2a_2$) or

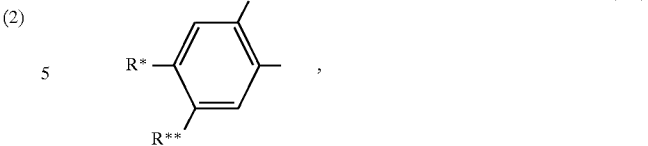 ($2a_3$)

wherein R' is hydrogen, methyl or sulfo, R" is hydrogen, and one of R* and R** is hydrogen and the other is sulfo, and Y is vinyl, β-chloroethyl, β-sulfatoethyl, β-thiosulfatoethyl, β-acetoxyethyl, β-phenoxyethyl or β-phosphatoethyl.

18. A process for the preparation of a compound of formula (1) according to claim 14, which comprises reacting about 1 molar equivalent each of a compound of formulae

 D—$NH_2$, (7)

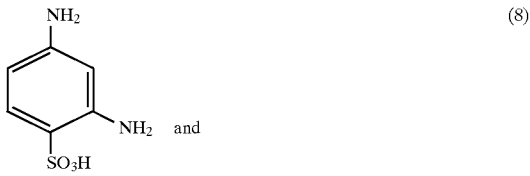 (8)

and

 $H_2N$—M—N═N—$D_1$, (9)

wherein the variables have the meanings given in claim 14, with each other by diazotising and coupling in any order.

19. A process for dyeing or printing hydroxyl group-containing fibre material, which process comprises the step of applying to said fibre material a tinctorially effective amount of a compound of formula (1) according to claim 14.

20. A process according to claim 19 wherein said fibre material is cellulosic fibre material.

21. A process for dyeing or printing nitrogen-containing fibre material, which process comprises the step of applying to said fibre material a tinctorially effective amount of a compound of formula

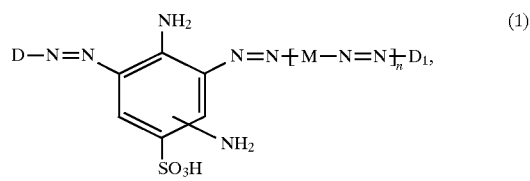 (1)

wherein $D_1$ is a radical of formula

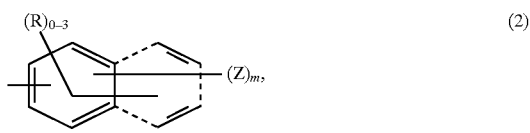 (2)

D is a radical of formula

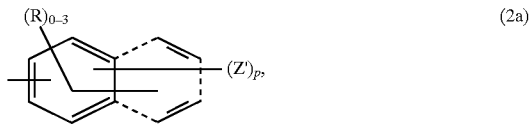 (2a)

M is a phenylene radical which is unsubstituted or substituted by sulfo, $C_1$-$C_4$alkyl, $C_1$-$C_4$-alkoxy, halogen, $C_2$-$C_4$alkanoylamino, ureido or a radical of formula

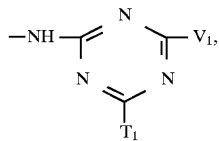 (3)

or a naphthylene radical which is unsubstituted or substituted by sulfo or hydroxy, $(R)_{0-3}$ and $(R_1)_{0-3}$ are each independently of one another 0 to 3 identical or different radicals selected from the group consisting of sulfo, $C_1$-$C_4$alkyl, $C_1$-$C_4$alkoxy and halogen, $T_1$ is halogen or 1-pyridinyl which is unsubstituted or substituted by carbamoyl or carboxy, $V_1$ is a non-reactive amino radical, Z and Z' are each independently of the other a radical of formula -SO$_2$-Y (4a) or -CONH-(CH$_2$)$_r$-SO$_2$-Y (4b), Y is vinyl or a -CH$_2$-CH$_2$-U radical, and U is a leaving group, r is an integer from 1 to 6, and n, m and p are each independently of one another a number from 0 to 1, with the proviso that m is 1 if D is a radical of formula (2a), wherein p is 0.

* * * * *

(12) EX PARTE REEXAMINATION CERTIFICATE (7037th)
United States Patent
Deitz et al.

(10) Number: US 5,817,779 C1
(45) Certificate Issued: Sep. 1, 2009

(54) AZO REACTIVE DYES, THEIR PREPARATION AND USE

(75) Inventors: Rolf Deitz, Kandren (DE); Paul Herzig, Basel (CH); Athanassios Tzikas, Pratteln (CH)

(73) Assignee: Huntsman International LLC, The Woodlands, TX (US)

Reexamination Request:
 No. 90/010,215, Jul. 7, 2008

Reexamination Certificate for:
 Patent No.: 5,817,779
 Issued: Oct. 6, 1998
 Appl. No.: 08/783,183
 Filed: Jan. 15, 1997

(30) Foreign Application Priority Data

Jan. 19, 1996 (CH) .......................................... 00150/96

(51) Int. Cl.
 *C09B 62/44* (2006.01)
 *C09B 62/513* (2006.01)

(52) U.S. Cl. .................................... 534/637; 534/642
(58) Field of Classification Search ................. None
 See application file for complete search history.

(56) References Cited

FOREIGN PATENT DOCUMENTS

KR 90004223 6/1990

*Primary Examiner*—Evelyn Huang

(57) ABSTRACT

Described are compounds of formula

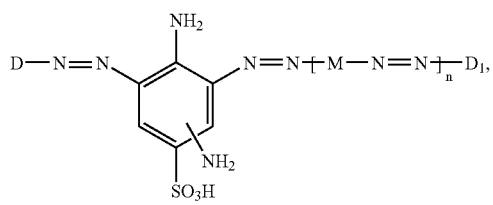

which are suitable as fibre-reactive dyes for dyeing and printing a very wide range of different fibre materials.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 14 is determined to be patentable as amended.

Claims 1–13 and 15–21 were not reexamined.

14. A compound of formula

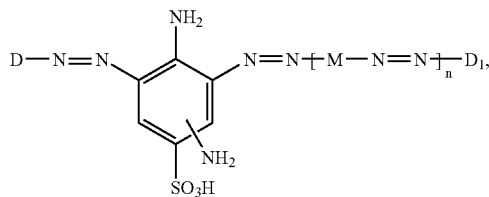

(1)

wherein $D_1$ is a radical of formula

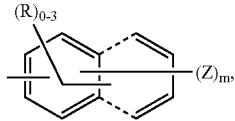

(2)

D is a radical of formula

[ 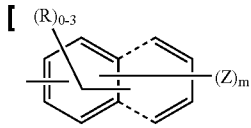

(2a)

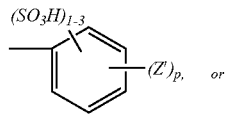

(2a*′)

or

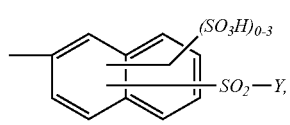

(2″)

M is a phenylene radical which is unsubstituted or substituted by sulfo, $C_1$-$C_4$alkyl, halogen, $C_2$-$C_4$alkanoylamino, ureido or a radical of formula

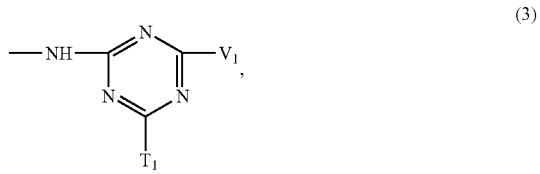

(3)

or a naphthylene radical which is unsubstituted or substituted by sulfo, $(R)_{0-3}$ [and $(R_1)_{0-3}$ are each independently of one another] *is* 0 to 3 identical or different radicals selected from the group consisting of sulfo, $C_1$-$C_4$alkyl and halogen, $T_1$ is halogen or 1-pyridinyl which is unsubstituted or substituted by carbamoyl or carboxy, $V_1$ is a non-reactive amino radical, Z and Z' are each independently of [the] *one* another a radical of formula $$-SO_2-Y \quad (4a)$$
$$-CONH-(CH_2)_r-SO_2-Y \quad (4b),$$

Y is vinyl or a -$CH_2$-$CH_2$-U radical, and U is a leaving group, r is an integer from 1 to 6, and n, m and p are each independently of one another a number from 0 to 1, with the proviso that m is 1 if D is a radical of formula [(2a)] (*2a*′), wherein p is 0, and with the proviso that D and $D_1$ have different meanings, if n is 0.

]

* * * * *